United States Patent [19]

Hancock et al.

[11] 3,929,498

[45] Dec. 30, 1975

[54] SINTERED ZIRCONIA BODIES

[75] Inventors: John Douglas Hancock, Bolton; Matthew A. Hepworth, Cheadle Hulme, both of England

[73] Assignee: Magnesium Elektron Limited, Manchester, England

[22] Filed: Apr. 30, 1975

[21] Appl. No.: 465,602

Related U.S. Application Data

[63] Continuation of Ser. No. 350,064, April 11, 1973, abandoned.

[30] Foreign Application Priority Data

Apr. 11, 1972 United Kingdom............... 16651/72

[52] U.S. Cl. .................................................. 106/57
[51] Int. Cl.$^2$......................................... C04B 35/48
[58] Field of Search.......................... 106/57; 51/309

[56] References Cited
UNITED STATES PATENTS

| | | | |
|---|---|---|---|
| 2,567,592 | 9/1951 | Ballard................................. | 106/57 |
| 3,350,230 | 10/1967 | Tannenberger et al............... | 106/57 |
| 3,365,317 | 1/1968 | Yavorsky.............................. | 106/57 |
| 3,432,314 | 3/1969 | Mazdiyasni et al................... | 106/57 |
| 3,620,781 | 11/1971 | Garvie................................... | 106/57 |

*Primary Examiner*—J. Poer
*Attorney, Agent, or Firm*—Karl W. Flocks

[57] ABSTRACT

A sintered zirconia body is made by sintering a compacted composition consisting of 10 – 100% by weight of baddeleyite and 0 – 90% by weight of pure zirconia, at least 10% by weight of the composition having an average grain size not exceeding 5 microns. The composition may contain up to 2 mole % of yttria and/or up to 15 mole % of calcium oxide and/or magnesium oxide as a stabiliser.

14 Claims, No Drawings

SINTERED ZIRCONIA BODIES

This is a continuation of application Ser. No. 350,064, filed Apr. 11, 1973, abandoned without prejudice in favor of the present application.

BACKGROUND OF THE INVENTION

The present invention relates to sintered zirconia bodies and a process for the preparation thereof.

Because of its very high melting point of 2650°C and its chemical inertness at high temperatures, pure zirconia appears, at first sight, to be very attractive as a material for the preparation of ceramics usable at very high temperatures but dense bodies of pure zirconia undergo a destructive volume change, which is accompanied by a change in structure from monoclinic to tetragonal, at about 1100°C. It is known to reduce this volume change by mixing certain other oxides, such as calcia and magnesia, with zirconia prior to firing the mixture to convert the zirconia to a cubic modification, which is stable between room temperature and the melting point of the mixture. By restricting the additions of these other oxides to about 15 mole % with respect to the zirconia, the melting point of the zirconia is little affected and ceramic bodies of such a "stabilised" zirconia have become well known articles of commerce. However, it is difficult to prepare high density stabilised zirconia bodies when calcia is used as the stabiliser whilst bodies containing magnesia destabilise on thermal cycling in the temperature range 1000°–1500°C.

Other oxides of the general formula $R_2O_3$ are known to be capable of producing the desired cubic modification in the zirconia when added in a quantity of at least 6 mole % with respect to the zirconia. One of the first of these oxides to be discovered to give this effect and the one which has been the subject of the largest number of subsequent investigations is yttria, $Y_2O_3$. These investigations have established that cubic stabilised zirconia containing 6 mole % $Y_2O_3$ can be formed from a mixture of the oxides when heated to 2000°C. These investigations indicated that oxides of other trivalent elements with a similar ionic radius to yttria, i.e. scandium and the rare earth metals from samarium (Atomic No. 62) to lutecium (Atomic No. 71) should also stabilise zirconia in the same modification when added in 6 mole % or greater amounts with respect to the zirconia. More recent investigations have shown that the addition of smaller quantities of yttria to zirconia, for example from 4 up to 6 mole % produce a tetragonal stabilised zirconia which does not undergo any phase transformation at elevated temperatures, that is temperatures ranging up to about 2000°C.

Other developments have shown that ceramics based on yttria stabilised zirconia possess additional useful features. U.S. Pat. No. 3,432,314 describes the preparation of mixtures of very pure zirconia and yttria by controlled hydrolysis of their alkoxides and discloses that these mixtures can be sintered at temperatures as low as 1450°C to give stabilised zirconia ceramics which have nearly theoretical density and which are translucent in thin sections. This U.S. specification also describes ytterbia and dysprosia stabilised zirconia using the same method of preparation.

It has been found that while yttria is similar to lime in permitting the production of stabilised zirconia ceramics, which are resistant to destabilisation on thermal cycling it has the additional advantages that the ceramics produced have superior corrosion resistance, for example, to molten glass, molten metals and titanates, and are better conductors of electricity at elevated temperatures than ceramics prepared from lime-stabilised zirconia.

It is clear that zirconia stabilised with yttria or one of the rare earth metal oxides ytterbia or dysprosia has considerable potential in the production of strong dense ceramics resistant both to temperatures in excess of 2000°C and conditions of extreme corrosion. Pure yttria is a very expensive material since it usually occurs in association with rare earth metal oxides in ores such as monazite or xenotime from which it is only separated by tedious and hence expensive procedures. Similarly, the rare earth metal oxides ytterbia and dysprosia are usually found in association with other rare earth metal oxides and to obtain them in the pure state is for the same reasons, expensive.

However, these separation procedures generate intermediate products containing 35 to 70% yttria with the remainder consisting substantially of oxides of rare earth metals whose atomic numbers range from 57 to 71.

The rare earth metals are commonly divided into two sub-groups, the cerium or "light" rare earth metal sub-group consisting of elements whose atomic numbers range from 57 to 61, and the yttrium or "heavy" rare earth metal sub-group consisting of rare earth metals whose atomic numbers range from 62 to 71. It will be noted that yttrium, atomic number 39, is not, itself, a rare earth metal, although it occurs, in nature, in association with rare earth metals.

In the Applicants co-pending Application No. 30399/71, there has been described a stabilised zirconia body comprising zirconia and an yttria concentrate containing from 35 to 70% yttria and the remainder consisting substantially of rare earth metal oxides, the concentrate being present in a quantity sufficient to provide a total of at least 3 mole % of yttria and heavy rare earth metal oxides in the zirconia body.

By a "stabilised zirconia body" is meant a stabilised zirconia in the form of grains of articles having selected shapes such as bricks, sheets and other shapes usually associated with the ceramic and refractory products industries.

In the prior art and in the Applicants' co-pending Application No. 30399/71 the stabilised zirconia body has been produced using pure zirconia, pure zirconia in this context meaning zirconia that has been extracted by chemical means from one of its ores such as zircon, zirkite and baddeleyite.

SUMMARY OF THE INVENTION

According to one aspect of the present invention, there is provided a method of making a sintered zirconia body, which comprises sintering for from 2 to 3 hours at a temperature from 1550° to 1650°C a compacted composition consisting of from 10 to 100% by weight of baddeleyite and from 0 to 90% by weight of pure zirconia, at least 10% by weight of the mixture having an average grain size not greater than 5 microns.

According to one embodiment of the invention, the composition consists of 100% of baddeleyite ground to an average grain size not exceeding 2 microns whereby high density bodies are formed on sintering.

The products obtained by this preferred process have been found to be of high density and have only a small number of fine cracks. Pure zirconia when subjected to the same process gives products which have very large cracks, unsuitable for use as refractories, or have disintegrated completely. The baddeleyite used may be in the form of a black sand containing from 96 to 99% by weight zirconia ($ZrO_2$). A typical sample of baddeleyite has a chemical composition as follows:

| | |
|---|---|
| $ZrO_2$ | 98.5% by weight |
| $TiO_2$ | 0.5% by weight |
| $Fe_2O_3$ | 0.3% by weight |
| $SiO_2$ | 0.3% by weight | the balance being made up of very small percentages of undetermined impurities. It is made up of particles of the following sizes:

| | | | |
|---|---|---|---|
| 1% | of total larger than | 72 | mesh |
| 20% | of total larger than | 100 | mesh |
| 60% | of total larger than | 150 | mesh |
| 83% | of total larger than | 200 | mesh |
| 17% | of total smaller than | 200 | mesh |

It has been found that to prepare high density products from such baddeleyite sand it was preferable to grind the sand to an average particle size, as measured by the Fisher apparatus, of less than two microns.

In another preferred embodiment of the invention, the composition consists of from 10 to 90% by weight of baddeleyite sand and from 10 to 90% by weight of baddeleyite sand or pure zirconia which has previously been ground to an average particle size not exceeding 2 microns.

According to another aspect of the invention, a mixture for the production of a sintered zirconia body comprises from 10 to 90% by weight of baddeleyite sand and from 10 to 90% by weight of baddeleyite sand or pure zirconia which has previously been ground to an average particle size not exceeding 2 microns.

Preferably, the mixture contains from 40 to 80% baddeleyite and from 60 to 20% zirconia.

Advantageously, the composition is partially stabilised by the inclusion in the mixture of up to 2 mole % of yttria concentrate or the inclusion of up to 15 mole %, and preferably 2 to 5 (mole %, of either calcium or magnesium oxide or the inclusion of a mixture of yttria concentrate and calcium and/or magnesium oxide. In the case of calcium oxide, i.e., lime, the maximum 5 mole % corresponds to 2.3 weight percent of the mixture.

A conventional lubricant and binder, for example a polyethylene glycol wax is preferably incorporated in the mixture which is then compacted into the required shape in a suitable steel die using a conventional brick press or by using flexible moulds in an isostatic press to minimise density variations in the green shape.

Sintering is preferably carried out at a peak temperature above 1600°C for a period sufficient to ensure complete soaking of the shape at the peak temperature to develop the optimum mechanical properties in the final product.

A suitable yttria concentrate for stabilising zirconia had an analysis as follows:

| | |
|---|---|
| $Y_2O_3$ | 56% |
| $Dy_2O_3$ | 18% |
| $Er_2O_3$ | 4% |
| $Ho_2O_3$ | 3% |
| $Gd_2O_3$ | 8% |
| $La_2O_3$ | 0.2% |
| $CeO_2$ | 0.5% |
| other rare earth metal oxides | 6% | such an yttria concentrate may be included in the mixture of baddeleyite and zirconia used in the production of sintered zirconia bodies and the mixture shaped and sintered directly. However, it is preferred to calcine the mixture at a temperature of from 1100°C to 1200°C for two hours and then regrind the sintered product before pressing into the required shapes. It has been found that this additional step improves the compaction and flow properties of the mixture on pressing.

In one series of tests 0.25% by weight of polyethylene glycol wax was incorporated during regrinding, in the mixture as pressing lubricant and binder. Shapes were made from the reground mixture using a pressure of 5 tons per square inch and sintered for 3 hours at a peak temperature of 1620°C in a gas fired kiln. These tests are summarised in the following table.

| Amount of yttria concentrate present mole % | Sintered density g/cc | Phases present* |
|---|---|---|
| 0.21 | 5.47 | M |
| 0.43 | 5.60 | M |
| 0.86 | 5.65 | M + 5% C |
| 1.72 | 5.72 | M + 20% C |
| 3.43 | 5.76 | M + 40% C |

*X-ray determination
M = monoclinic
C = cubic.

Examination of the compacted and sintered shapes showed that those containing more than 0.2 mole % of yttria concentrate were crack free and had densities of from 5.6 to 5.7 g/cc. X-ray diffraction photographs of a powder derived from a compacted and sintered shape containing 0.8 mole % of yttria concentrate showed monoclinic zirconia to be present and only a trace of the cubic phase.

Larger shapes weighing from 1 to 2 Kgm were prepared using the same procedure as just described except that an isostatic pressing technique was used to eliminate density variations in the green shape. The compacted and sintered shapes produced were of high density, flaw-free and consisted essentially of monoclinic zirconia.

DESCRIPTION OF PREFERRED EMBODIMENTS

So that the present invention may be clearly understood the following examples are given by way of illustration:

EXAMPLE 1

Baddeleyite sand, such as that previously described was wet milled, using steel balls as the grinding media, to an average particle size as determined by the Fisher method of less than 2 microns. The resulting slurry was freed of steel detritus by the addition of hydrochloric acid and allowing to stand for several hours. The solid material was then filtered off, washed with water and dried. Mixtures of the milled and unmilled baddeleyite sand were then prepared with the compositions set out in the following table. 4% by weight of polyethylene glycol wax was added as an aqueous solution to each of the mixtures to act as a lubricant and binder. The mixtures were dried, granulated through a 20 mesh sieve and pressed at 20,000 pounds per square inch in rubber moulds, using an isostatic press, into rectangular blocks each weighing approximately 2Kg.

The blocks were then sintered at 1650°C for 3 hours and allowed to cool naturally with the kiln.

| Composition of the Mixture | | Fired density g/cc |
|---|---|---|
| Unmilled Sand | Milled Sand | |
| 33% | 67% | 4.85 |
| 50% | 50% | 4.50 |
| 67% | 33% | 4.20 |

The sintered blocks were found to be of porous monoclinic zirconia, free of flaws and to have the fired densities shown in the table.

EXAMPLE 2

Baddeleyite sand, such as that previously described was wet milled using yttria stabilised zirconia grinding media to an average particle size as determined by the Fisher method of less than 2 microns. The milled mixture was mixed with 2% by weight of an yttria concentrate such as that previously described and the mixture calcined at 1250°C for 2 hours. The calcined product was wet milled for 2 hours in a ball mill using a balls: charge ratio of 10:1, 0.5% by weight of polyethylene glycol wax being present to act as a lubricant and binder. The slurry was separated from the milling balls and the remaining solid material was filtered off, washed and dried. The dried material was granulated to form a free flowing powder which was compacted in steel dies at a pressure of 5 tons per square inch into 0.75 inch long right cylinders. The green cylinders were sintered in a gas fired kiln at a peak temperature of 1650°C for 3 hours.

The sintered cylinders had zero open porosity and a fired density of 5.65 g/cc. Examination of the microstructure showed a range of grain sizes between 5 and 15 microns. The high density, hardness, low porosity and comparatively small grain size all combine to make the cylinders suitable for grinding purposes.

We claim:

1. A method of making a sintered zirconia body, which comprises sintering a compacted composition consisting essentially of from 10 to 100% by weight of baddeleyite sand, from 0 to 90% by weight of pure zirconia and zero to 2 mole % yttria stabilizer, at least 10% by weight of the composition having an average grain size not greater than 5 microns.

2. A method as claimed in claim 1, in which the composition is sintered for from 2 to 3 hours at a temperature from 1550° to 1650°C.

3. A method as claimed in claim 1, in which the composition consists of 100% of baddeleyite sand ground to an average grain size not exceeding 2 microns.

4. A method as claimed in claim 1, in which the composition consists of from 10 to 90% by weight of baddeleyite sand and from 10 to 90% by weight of baddeleyite sand which has previously been ground to an average particle size not exceeding 2 microns.

5. A method as claimed in claim 1, in which the composition consists of from 10 to 90% by weight of baddeleyite sand and from 10 to 90% by weight of zirconia which has previously been ground to an average particle size not exceeding 2 microns.

6. A method as claimed in claim 5, in which the mixture contains from 40 to 80% by weight of baddeleyite sand and from 20 to 60% by weight of pure zirconia.

7. A method as claimed in claim 1, in which the composition contains a lubricant.

8. A method as claimed in claim 7, in which the lubricant is polyethylene glycol wax.

9. A method as claimed in claim 1, in which the composition is compacted by isostatic pressing.

10. A method in accordance with claim 1, wherein said stabilizer is an yttria concentrate and is present in an amount of not more than 2 mole %.

11. Sintered zirconia bodies, when made by a method as claimed in claim 1.

12. A mixture for the production of a sintered zirconia body, which consists essentially of from 10 to 90% by weight of baddeleyite sand, from 10 to 90% by weight of baddeleyite sand or pure zirconia which has previously been ground to an average particle size from 2 to 5 microns, and zero to 2 mole % yttria stabilizer.

13. A mixture as claimed in claim 12, which consists essentially of from 40 to 80% by weight of baddeleyite sand and from 20 to 60% by weight of pure zirconia.

14. A mixture in accordance with claim 12, wherein said stabilizer is an yttria concentrate present in an amount of not more than 2 mole %.

* * * * *